D. CLOW.
Grain Winnower.
No. 113.
Reissued May 16, 1848.
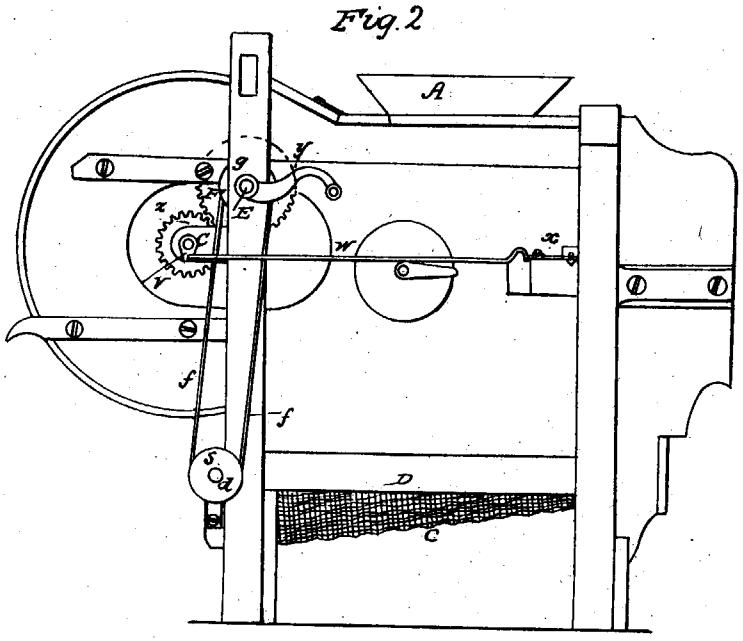
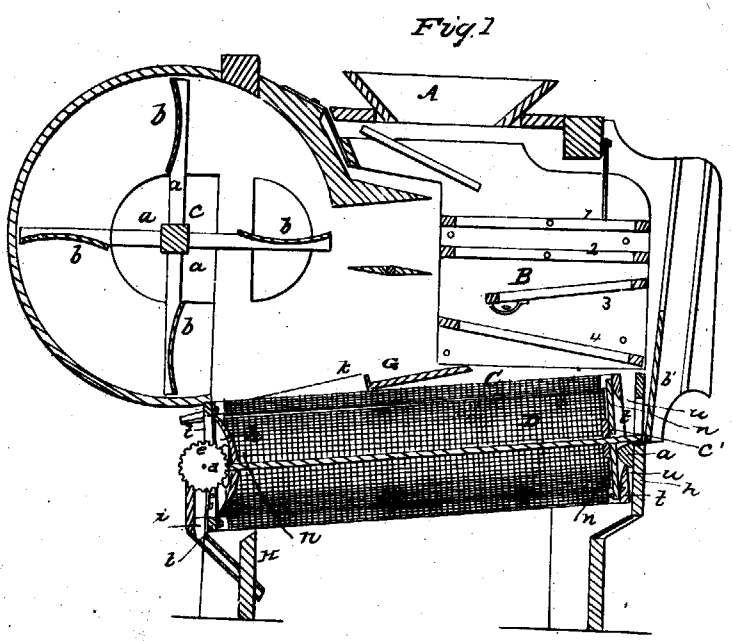
N. PETERS. Photo-Lithographer. Washington, D.C.

UNITED STATES PATENT OFFICE.

DANIEL CLOW, OF PORT BYRON, NEW YORK.

IMPROVEMENT IN WHEAT-FANS.

Specification forming part of Letters Patent No. 4,582, dated June 16, 1846; Reissue No. 104, dated October 30, 1847; Reissue No. 113, dated May 16, 1848.

*To all whom it may concern:*

Be it known that I, DANIEL CLOW, of Port Byron, in the county of Cayuga and State of New York, have invented a new and Improved Fanning-Mill, which I denominate "Clow's Combined Rotating and Vibrating Screen Fanning-Mill;" and I do hereby declare the following to be a full, clear, and exact description thereof, reference being had to the accompanying drawings, making a part of this specification, in which—

Figure 1 is a vertical longitudinal section, and Fig. 2 a side elevation thereof.

The same letters indicate like parts in both figures.

The supporting-frame of my improved fanning-mill is constructed in the usual manner.

The nature of my invention consists in the combination of vibrating and rotating screens with each other, substantially in the manner represented in the accompanying drawings, and hereinafter set forth.

A is the hopper.

B is the shoe, containing the usual series of vibrating screens, which may be constructed, suspended, and vibrated in any well-known or usual manner, save that the lowest screen, 4, in the series is secured in the shoe in such a manner that it can be inclined toward the front or the rear and retained in either position.

C D are the rotating screens, placed under the vibrating screens and inclining from the rear to the front end of the mill. The screen D is placed within and concentric with the screen C, the one being confined to the inner and the other to the outer periphery of the annular heads *t t*, which annular heads are secured to the shaft *m* by the arms *n n*. The screens are stretched longitudinally, and the requisite tension given to them by the nut *c'*, working on a screw near the rear end of the shaft *m*, and bearing against the rear arms, *n n*, which play freely longitudinally on the shaft. The inner screen, D, is coarse, and the outer screen is of finer texture. The meshes in the inner screen are of such a size that they will allow the grains of wheat or rye to pass through them onto the outer screen, but will retain every coarser substance. The meshes in the outer screen, C, are just fine enough to retain the kernels of wheat or rye and allow the cockle and every smaller substance to pass through them as the screen is revolved. The grain is first acted upon by the vibrating screens 1 2 3 4, and by the blast from the fan-wheel *a b c*, in the usual manner. The screen 4 or its equivalent being inclined to the rear, then conducts the grain into the space between the cross-board *h'* and the guiding-board *b'*, from which it passes through the aperture *a'* in the cross-board *h'* over the spout *d* into the inner rotating screen, D. The rotary motion of the screens C D and their inclined position carries the kernels of grain forward in C, as they fall through the meshes in D, from which they are discharged through the enlarged meshes at its front end on the front side of the transverse division-board H, thoroughly cleaned and separated from every foreign substance. The seeds smaller than the kernels of grain are discharged through the meshes of the outer screen, C, onto the floor under the mill in the rear of the division-board H. The substances coarser than the kernels of grain are retained in the inner screen, D, and are carried forward in the same and discharged from its front end into the spout *i*, which conducts them through and to the rear of the division-board H under the rotating screens, thus causing a perfect separation of the grain from every foreign substance. Motion is imparted to the screens C D by the bevel-pinion *e* on the transverse shaft *d*, working into a bevel-pinion, *h*, on the screen-shaft *m*, and the band *f*, connecting the pulley *s* on shaft *d* with the driving-pulley *g* on crank-shaft E.

*y* is a crank on the shaft E.

F is a cog-wheel on the shaft E, working into and communicating motion to the cog-wheel Z on the fan-shaft *c*.

*v* is a crank on the fan-shaft *c*, which communicates a vibratory movement to the shoe B through the medium of the connecting-rod *w* and the elbow or bent lever *x* in the usual manner.

I propose to give the rotating screens C D any form that I may deem best, either round, angular, conical, or any other shape.

I will make use of one, two, or more sieves or screens, substantially as herein set forth, with the size and shape of their meshes adapted to produce a perfect separation of every variety of seeds and grains from every other description of seeds and grains or other substances, the gist of my invention consisting in the combination, with each other in one and the same machine, of vibrating and rotating screens, substantially as herein described.

Should it be found by practice that some descriptions of grain or seeds can be cleaned by the blast and vibrating screens without the aid of the rotating screens, the rotating screens may be detached from the crank-shaft, and the lower screen, 4, inclined forward, so as to conduct the seeds or grain onto the apron G, which will discharge the same at the front of the mill. An opening is cut out of the central portion of the apron G to accommodate a portion of the front end of the rotating screen C, that rises through the same.

K is a ledge surrounding the opening in G, to prevent the grain from falling through the same.

It will readily be perceived that by combining rotating with vibrating screens a fanning-mill can be constructed, much smaller and more compact than the ordinary vibrating-screen fanning-mill, that will have double the amount of screen-surface.

The combined action of rotating screens with vibrating screens it is found in practice will remove many seeds and impurities from grain that cannot be removed by vibrating or rotating screens alone.

The foulest grain is perfectly cleaned by passing it once through my improved rotating and vibrating screen fanning-mill, which cannot with truth be said of any other fanning-mill.

Having thus fully described my improved combined rotating and vibrating screen fanning-mill, what I claim therein as new, and desire to secure by Letters Patent, is—

The combination and arrangement of the vibrating and rotating screens with each other in such a manner that by tilting or inclining one of the vibrating screens or its equivalent in one direction the vibrating screens will be brought into combination with the rotating screens, and by tilting or inclining one of the vibrating screens or its equivalent in an opposite direction the vibrating screens will be disconnected from the rotating screens and brought into combination with the tail-board, not intending by this claim to limit myself to the identical mechanical construction and arrangement of parts as herein described and represented, but shall vary the same as I may deem expedient, while I attain the same end by means substantially the same.

DANIEL CLOW.

Witnesses:
JACOB P. YATES,
HENRY K. FORD.